United States Patent
Schwindt

(10) Patent No.: US 9,576,465 B1
(45) Date of Patent: Feb. 21, 2017

(54) SYSTEM AND METHOD FOR IDENTIFYING STOLEN WIRELESS DEVICES

(71) Applicant: L8NT, LLC, Iowa City, IA (US)

(72) Inventor: David James Schwindt, Iowa City, IA (US)

(73) Assignee: L8NT, LLC, Iowa City, IA (US)

( * ) Notice: Subject to any disclaimer, the term of this patent is extended or adjusted under 35 U.S.C. 154(b) by 0 days.

(21) Appl. No.: 14/931,119

(22) Filed: Nov. 3, 2015

Related U.S. Application Data

(60) Provisional application No. 62/079,323, filed on Nov. 13, 2014.

(51) Int. Cl.

| | |
|---|---|
| *G08B 1/08* | (2006.01) |
| *G08B 21/24* | (2006.01) |
| *H04W 4/02* | (2009.01) |
| *H04W 48/16* | (2009.01) |

(52) U.S. Cl.
CPC ............ *G08B 21/24* (2013.01); *H04W 4/02* (2013.01); *H04W 48/16* (2013.01)

(58) Field of Classification Search
CPC ........ H04W 4/02; H04W 48/16; H04W 64/00; G08B 21/24; G01S 5/04
USPC ............ 340/539.21, 539.11, 539.13, 539.32; 455/404.2, 456.1
See application file for complete search history.

(56) References Cited

U.S. PATENT DOCUMENTS

| | | | |
|---|---|---|---|
| 8,098,155 B2 | 1/2012 | Gloo et al. | |
| 2004/0160363 A1* | 8/2004 | Powers ................. | H04W 64/00 342/430 |
| 2006/0128354 A1* | 6/2006 | Carle ..................... | A62B 33/00 455/404.1 |
| 2007/0082676 A1* | 4/2007 | Bhogal ............. | H04M 1/72522 455/456.1 |
| 2009/0325593 A1* | 12/2009 | Do ........................ | G08B 21/24 455/456.1 |

* cited by examiner

*Primary Examiner* — Anh V La
(74) *Attorney, Agent, or Firm* — Shuttleworth & Ingersoll, PLC; Jason Sytsma

(57) ABSTRACT

A first antenna configured to receive a signal from each of a plurality of devices. A library contains at least one unique identifier for at least one target device. A second antenna is used to geolocate the target device once the first antenna locates it in the vicinity of the system. A processor is coupled to the first antenna to receive the signal from the plurality of devices and extract the unique identifier from the signal. The processor compares the unique identifier from the signal to the unique identifiers in the library. Upon a match, the second antenna is used to locate the target device.

3 Claims, 4 Drawing Sheets

SYSTEM AND METHOD FOR IDENTIFYING STOLEN WIRELESS DEVICES

This application claims priority to U.S. Provisional Application No. 62/079,323 filed Nov. 13, 2014, the contents of which are hereby incorporated by reference herein.

BACKGROUND

Mobile electronic devices are an integral part of modern life. Notebooks, netbooks, tablet computers, smart phones and other portable devices comprise more than half of all computers produced worldwide. People use them to communicate, work, relax, and study. The memory in these devices store large amounts of personal data such as contacts, photographs, videos, authorization information, and much more. Corporate computers also contain official correspondence and documentation, which may include trade secrets. These mobile electronic devices, however, are often targets for theft or robbery in order to gain access to a computer's hard drive or to sell the computer for cash. Furthermore, portable devices are easily lost due to their size and the fact that they are constantly moved around by the user.

The current method for law enforcement to identify a device is to physically examine it to obtain the make, model, and serial number. With this information law enforcement can identify a stolen device. Physical examination of most devices, however, is extremely difficult because of Constitutional search and seizure issues. In most cases, law enforcement is only able to create a report of the theft for insurance purposes. Because there isn't a tool available to actively search for and locate devices, the nationwide recovery rate is between 3% and 6%. This low recovery rate is due to law enforcement's inability to actively search for devices which results in a public relations problem for agencies.

The present disclosure teaches how to eliminate the described deficiencies of prior art by taking a different approach.

SUMMARY

A system for identifying wireless devices is disclosed. The system comprises a first antenna configured to receive a signal from each of a plurality of devices. A library contains at least one unique identifier for at least one target device. A second antenna is used to geolocate the target device once the first antenna locates it in the vicinity of the system. A processor is coupled to the first antenna to receive the signal from the plurality of devices and extract the unique identifier from the signal. The processor compares the unique identifier from the signal to the unique identifiers in the library. Upon a match, the second antenna is used to locate the target device.

A method for locating a wireless device is also disclosed. The method begins by receiving a signal from each of a plurality of devices. The method continues by extracting a unique identifier from the signal from each of the plurality of devices and comparing the unique identifier from the signal with a unique identifier stored in a library.

DETAILED DESCRIPTION

Figure 1:
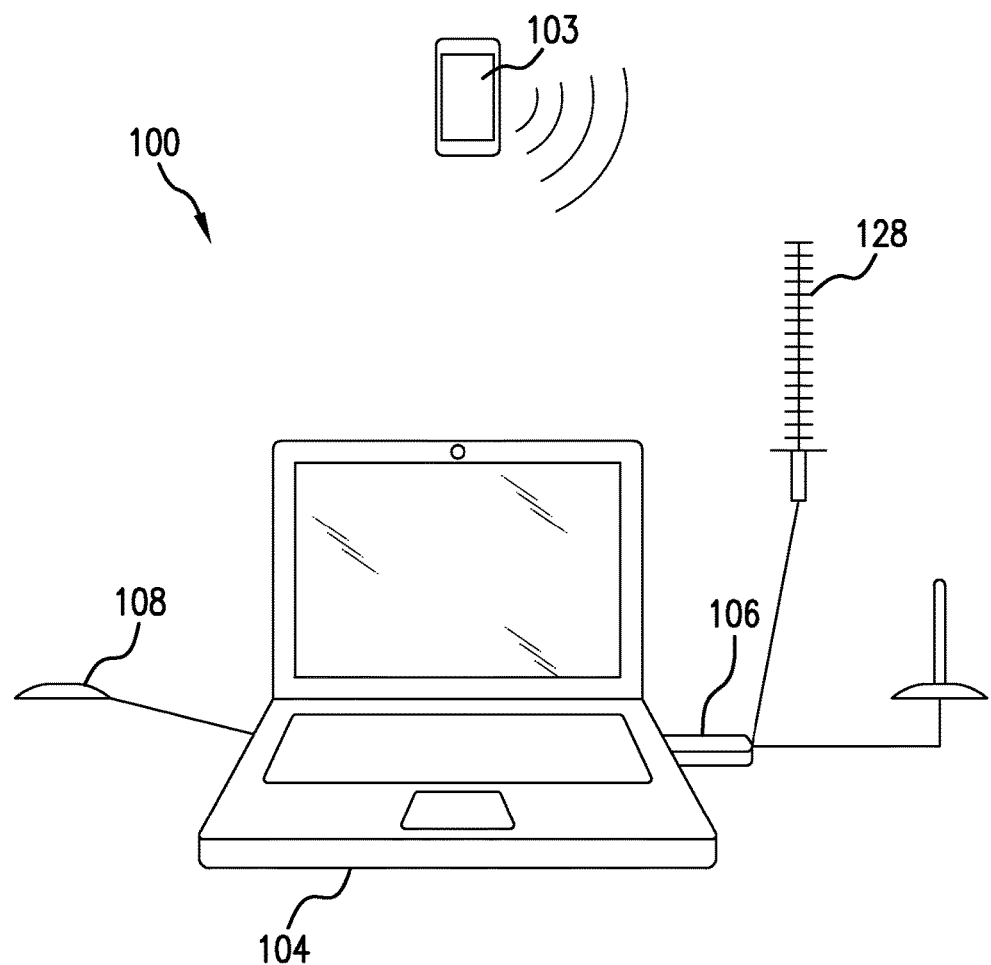
FIG. 1 is a schematic of a system for identifying stolen wireless devices.

FIG. 1 is a schematic of a system 100 for identifying at least one stolen or target device 103 among a plurality of wireless devices 102. Wireless device 103 and wireless devices 102 can be any type, such as wireless laptop computers, wireless workstations, personal digital assistants (PDA's), wireless digital cameras, wireless hard drives, wireless video cameras, wireless routers and gateways, voice-over-IP phones, and cellular phones. What typifies such wireless devices 102,103 is that they communicate using radio frequency (RF) transmissions on one or more frequencies or channels using one or more protocols which define the format of the data transmitted wirelessly using the RF transmissions. Examples of wireless protocols include, but are not limited to 802.11x, Zigbee, WiMax/802.16, Bluetooth®, CDMA, and GSM. A single wireless device may be configured to communicate wirelessly using more than one protocol. For ease of explanation, many of the embodiments described herein are described with respect to 802.11x (also referred-to as WiFi), however it should be understood that the embodiments may also be implemented using other protocols.

All communications or signals from wireless device 103 and wireless devices 102 include a unique identifier, such as a media access control (M.A.C.) address or service set identifier (SSID) which is transmitted as part of the wireless communications. The M.A.C. addresses, for example, are unique identifiers incorporated into wireless networking adapters by all manufacturers around the world. Every device 102, 103 has a unique M.A.C. address. By capturing wireless networking packets and extracting the source and destination M.A.C. addresses, one can uniquely identify a wireless device 102, 103. This is as good as a finger print, because the M.A.C. address is assigned by the manufacturer and remains consistent even if the storage medium or data on a system has been wiped or changed.

A computer 104 is equipped with a network adapter 106. Network adapter 106 can be a wireless network interface controller that connects to a radio-based network. Network adapter 106 can include a first antenna, which can be an internal or external antenna to communicate wirelessly using the RF transmissions. In an embodiment, an omnidirectional antenna is connected to network adapter 106, which transmits and receives over substantially all angles simultaneously. The omnidirectional antenna is used to collect signals from a number of wireless devices 102 simultaneously.

Once the signals from wireless devices 102 are collected, system 100 removes everything from the transmitted packet except for the unique identifier. The remaining portion of the signal contains the unique identifier, which can be one or more M.A.C. addresses (one for the source and one for the receiving device). When a M.A.C. address from a captured packet matches a M.A.C. address in the library the user may be notified that the device is being used in the general area. By filtering all packets, except those that have the suspect M.A.C. address in the source M.A.C. address location of the packet header, the user can focus on packets originating from target device 103 by using a second antenna 128 to sweep the area for changes in signal strength, while moving through the area to locate target device 103.

When a unique identifier match is found, system 100 can send an alarm to the user. System 100 may log the match including the unique identifier (e.g., the M.A.C. address), date, time, and/or location information, and store it in a mass storage 312 (see FIG. 3) in computer 104. System 100 may alert the user with an alert signal, which can be in the form of an audible sound or a visual message on a display, an e-mail to a preconfigured account or a text message to a cellular phone. System 100 can also be configured to passively alert an owner of target device 103 by email or text message without action required or knowledge of the user. A positioning system 108 for identifying a location of a match may include a global positioning system (GPS) receiver or a dedicated radio frequency (RF)-based location system to log the location of a match.

Second antenna 128 can be connected through network adapter 106. Second antenna 128 can be a directional antenna, which transmits and receives RF signals to and from a limited angle. One non-limiting example of a suitable directional antenna for this purpose is a 2.39 to 2.49 GHz 14.3 dBi Yagi Cantenna. When second antenna 128 is swept from side to side, the strength of the signal emanating from target device gets stronger and weaker. The user can narrow in on the location of target device 103 by focusing in on the strongest signal.

Figure 4:
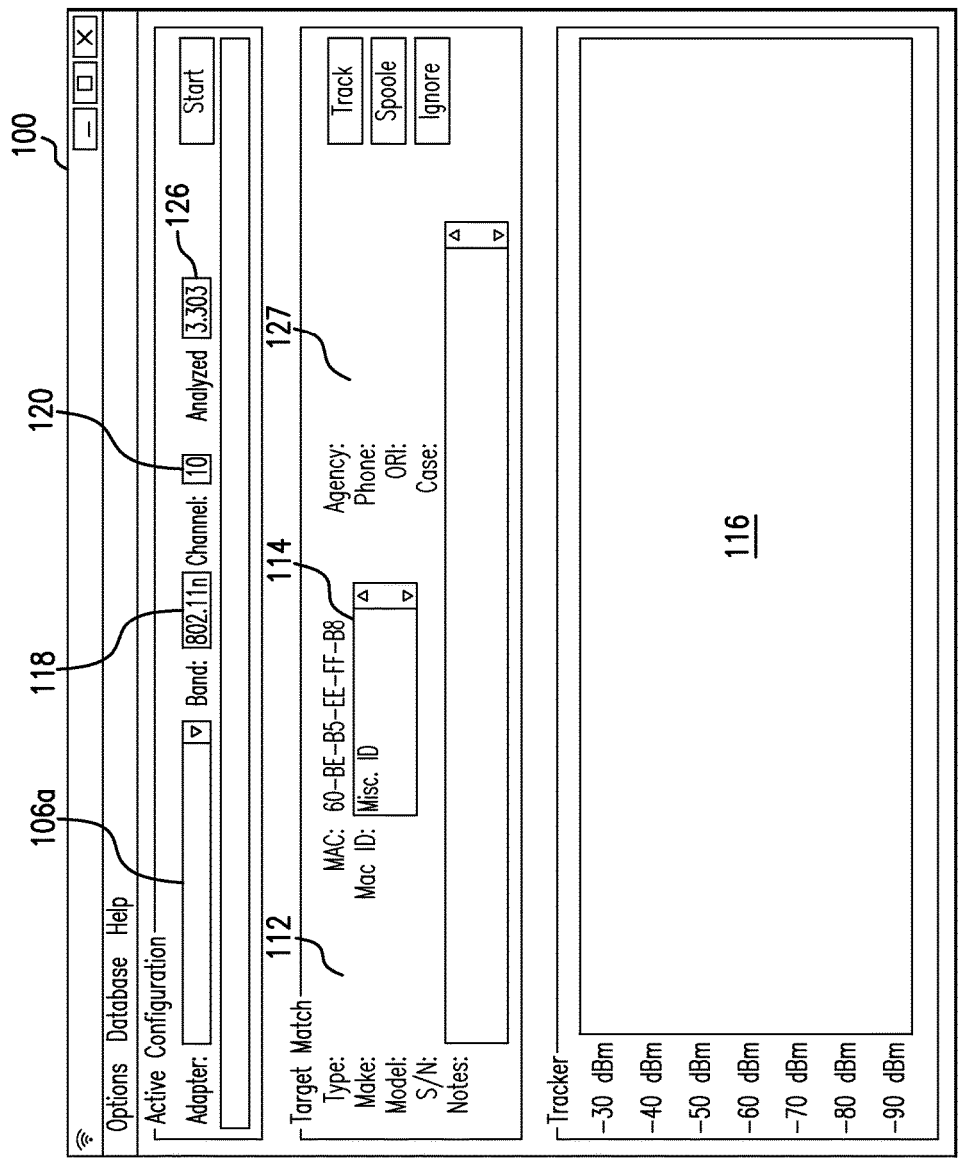
FIG. 4 illustrates a graphical user interface for alerting a user when a target device is located by the system of FIG. 1.

FIG. 4 shows a graphical user interface (GUI) 110 on a display screen of computer 104. GUI 110 displays the information necessary to alert a user when target device 103 is identified. GUI 110 includes under name 112 the name of target device 103. With name 112, the type (e.g. laptop, cellular phone, television, tablet, etc.), make, model, serial number, miscellaneous identifiers, and "notes" about the device can also be shown. Notes, for example, can include the nature of the crime involved in the loss of the device. Under M.A.C. address 114 is the M.A.C. address for target device 103. Under signal 116 is the signal strength in dBm of target device 103 that displays as a horizontally scrolling graph to visualize the changing signal strength. The signal strength can be obtained from an area of the packet that is added by network adapter 106 as it receives the signal. Under Band 118 is the wireless protocol that target device 103 is using and under channel 120 is the communication channel used by target device 103. Under 126 is the number of packets that were analyzed. Under 127 is information about the law enforcement agency that entered the device, including the agency's contact information and case number for the report detailing the theft of the device can be shown.

Figure 3:
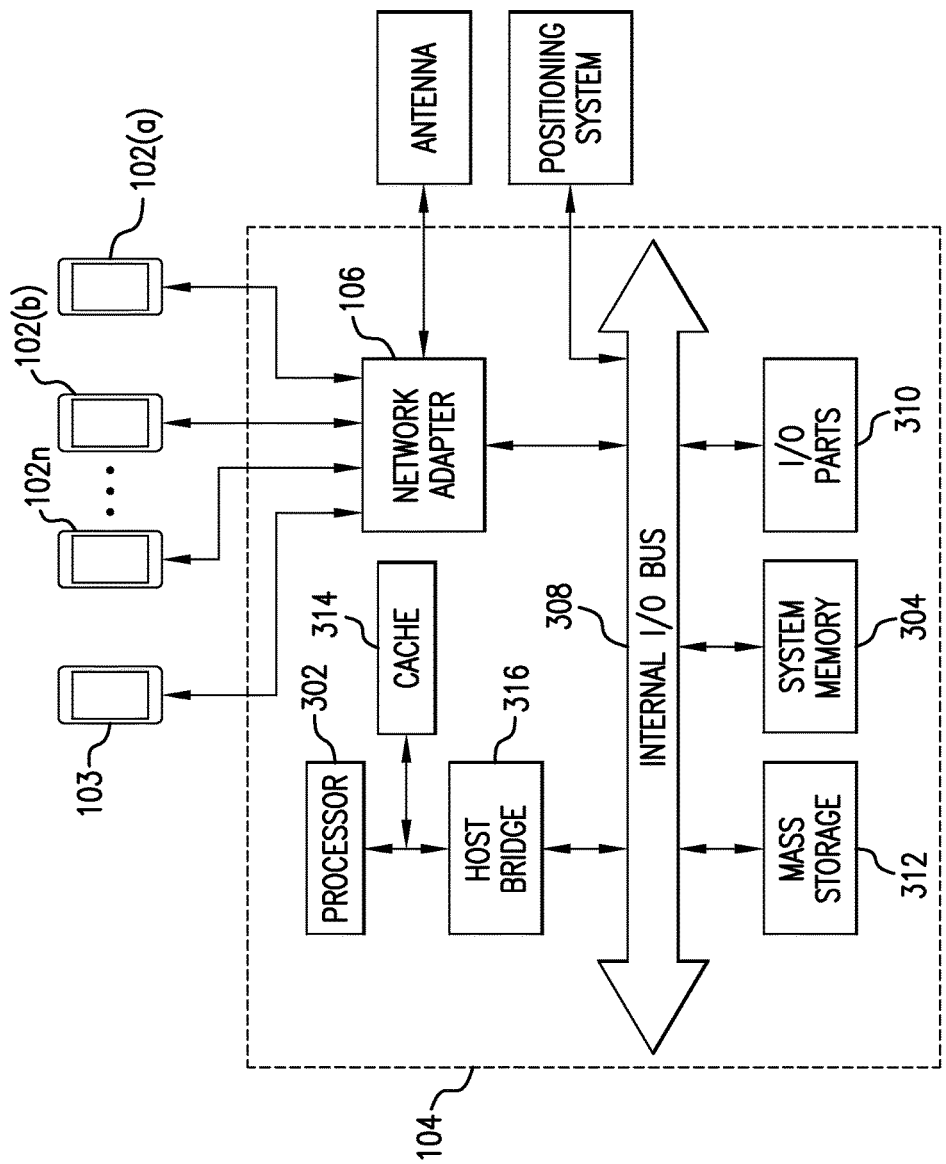
FIG. 3 is a schematic of the system of claim 1 implemented on a computer.

FIG. 3 is a schematic for a computer implementing the system of FIG. 1. Computer 104 includes a processor 302, a system memory 304, a network adapter 106 and one or more software applications and drivers enabling or implementing the functions described herein. Network adapter 106 (with its internal antenna) receives signals and delivers them to bus 308 of computer 104. The hardware system includes a standard I/O bus 308 with I/O Ports 310 and a mass storage 312 coupled thereto to store a library of unique identifiers for at least one target device 103. Host bridge 316 couples processor 302 to I/O bus 308. The hardware system may further include video memory and a display device coupled to the video memory.

Mass storage 312 can provide storage for the programming instructions, whereas system memory 304 (e.g., DRAM) is used to provide temporary storage for the data and programming instructions when executed by processor 302. I/O ports 310 are one or more serial and/or parallel communication ports used to provide communication between additional peripheral devices like a positioning system 108 (discussed below).

Computer 104 may include a variety of system architectures, and various components of computer 104 may be rearranged. For example, cache 314 may be on-chip with processor 302. Alternatively, cache 314 and processor 302 may be packed together as a "processor module," with processor 302 being referred to as the "processor core." Furthermore, certain implementations of the claimed embodiments may not require nor include all the above components. For example, additional components may be included computer 104, such as additional processors, storage devices, or memories. Computer 104 can also connect to an external storage or database where the library of unique identifiers for at least one target device 103 can be stored. In such a situation, all computers running the software and connected to the Internet can access the library creating a distributed detection network. Furthermore, computer 104 can be a desktop computer, laptop computer, notebook computer, tablet computer, personal digital assistant (PDA), microprocessor, application specific integrated circuit (ASIC), digital circuitry, analog circuitry, or any combination or plurality thereof.

Figure 2:
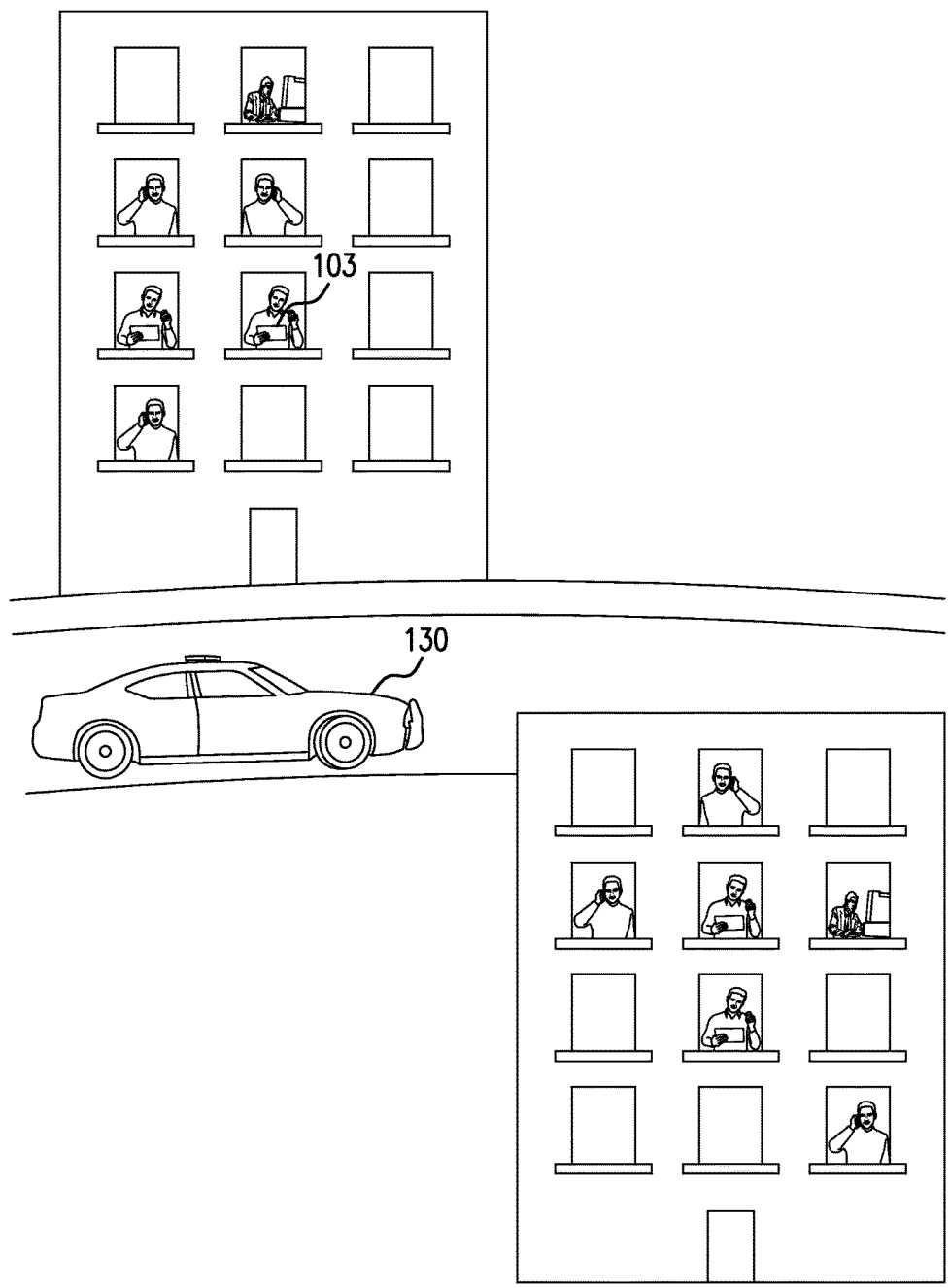
FIG. 2 illustrates the system of FIG. 1 implemented in a mobile cruiser.

FIG. 2 illustrates system 100 implemented in a mobile cruiser 130. Cruiser 130 implemented with system 100 drives through neighborhoods with first antenna in network adapter 106 receiving a signal from each of a plurality of devices 102. A library accessible by computer 104 includes at least one unique identifier for at least one target device 103. System 100 removes all but the unique identifier from the received signal and compares the unique identifier from the signal to the at least one unique identifier in the library. When there is a match, the user can be alerted, and a second antenna 128 for locating the at least one target device 103 can be used to narrow in on the location of target device 103.

While the present invention has been particularly shown and described with reference to exemplary embodiments thereof, it should be understood by those of ordinary skill in the art that various changes, substitutions and alterations can be made herein without departing from the scope of the invention as defined by the appended claims and their equivalents.

What is claimed is:

1. A system for identifying wireless devices, the system comprising:
    an omnidirectional antenna operable to receive a signal from each of a plurality of devices;
    a library containing at least one unique identifier for at least one target device;
    a directional antenna for locating the at least one target device;
    a processor coupled to the omnidirectional antenna and operable to receive the signal from each of the plurality of devices and extract the unique identifier from the signal and a strength of the signal, the processor is operable to compare the unique identifier from the signal with the library of at least one unique identifier to identify at least one target device among the plurality of devices, and the processor is coupled to the directional antenna;
    a user interface coupled to the processor, the processor operable to provide an alert signal to the user interface in response to the unique identifier from the signal being in the library; and
    wherein the plurality of devices includes the at least one target device and the processor cooperates with the directional antenna to locate the at least one target device based on the strength of the signal from the target device and provides the signal strength to the user interface to locate the at least one target device, and wherein the processor in response to identifying the at least one target device the processor filters out the signal from each of the plurality of devices except for the signal from the target device and removes a remaining portion of the signal from each of the plurality of devices from memory.

2. The system of claim 1, wherein the unique identifier is at least one chosen from a media access control (M.A.C.) address or service set identifier (SSID).

3. The system of claim 2, and further comprising a positioning system coupled to the processor operable to provide location information to the processor for the processor to associate with the at least one target device among the plurality of devices; and wherein the library is stored in a database accessible through an internet connection to create a distributed detection network.

* * * * *